G. W. SPALDING.
POCKETED CARRIER AND METHOD OF PRODUCING THE SAME.
APPLICATION FILED SEPT. 19, 1918.
1,339,794.
Patented May 11, 1920.
2 SHEETS—SHEET 1.
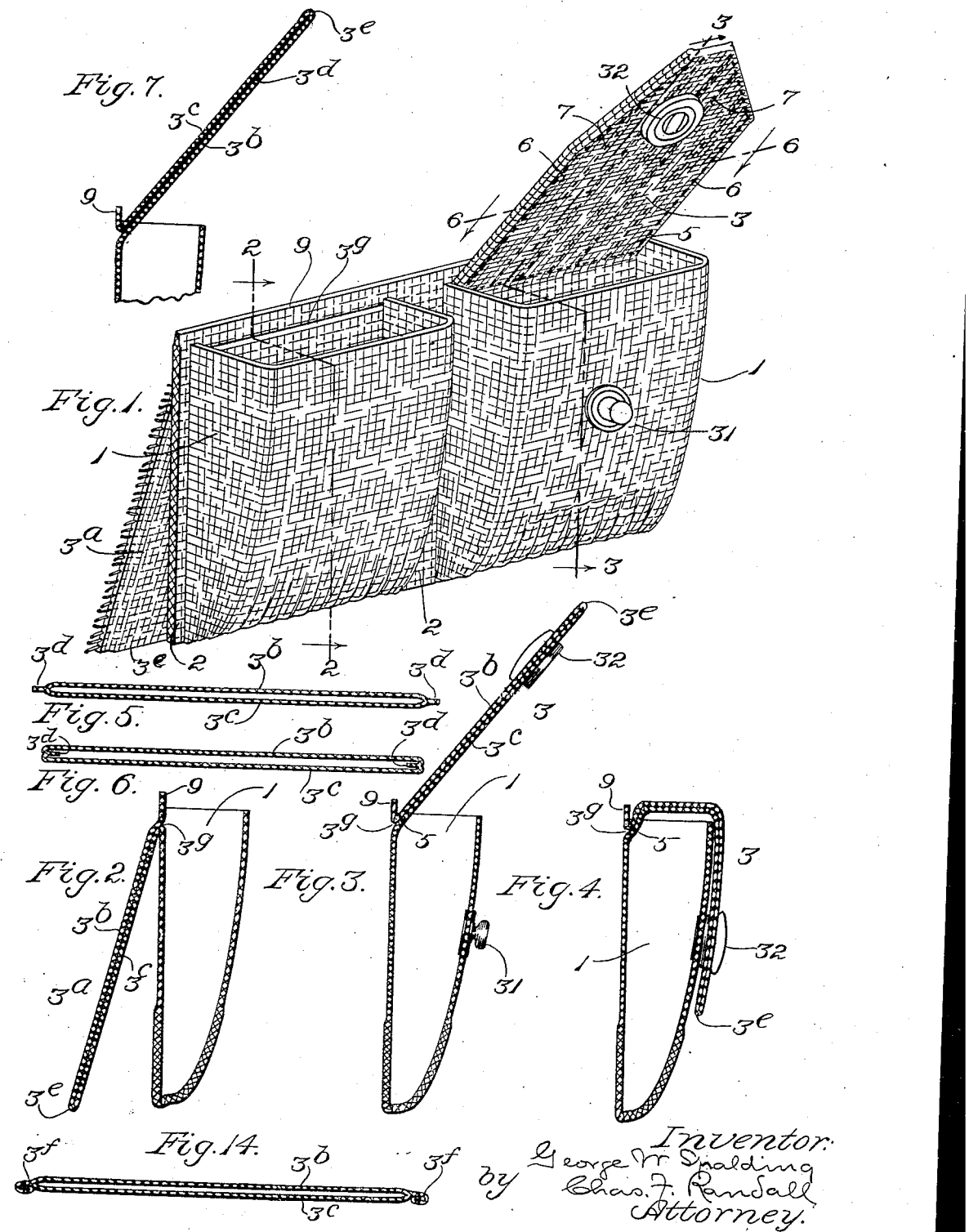

G. W. SPALDING.
POCKETED CARRIER AND METHOD OF PRODUCING THE SAME.
APPLICATION FILED SEPT. 19, 1918.
1,339,794.
Patented May 11, 1920.
2 SHEETS—SHEET 2.
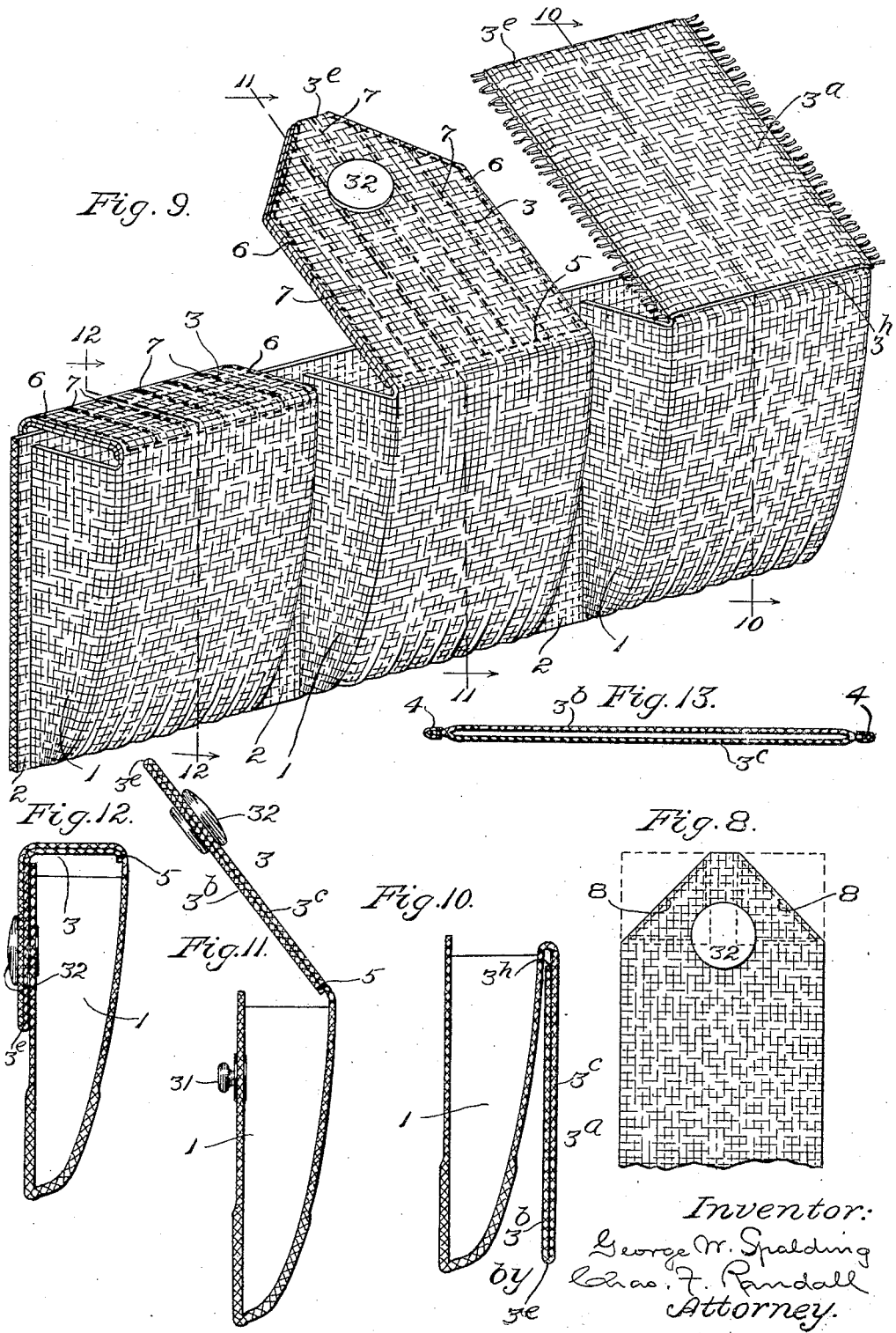

UNITED STATES PATENT OFFICE.

GEORGE W. SPALDING, OF WORCESTER, MASSACHUSETTS, ASSIGNOR, BY MESNE ASSIGNMENTS, TO MILLS WOVEN CARTRIDGE BELT COMPANY, OF WORCESTER, MASSACHUSETTS, A CORPORATION OF MASSACHUSETTS.

POCKETED CARRIER AND METHOD OF PRODUCING THE SAME.

1,339,794.

Specification of Letters Patent.  Patented May 11, 1920.

Application filed September 19, 1918. Serial No. 254,741.

*To all whom it may concern:*

Be it known that I, GEORGE W. SPALDING, a citizen of the United States, residing at Worcester, in the county of Worcester, State of Massachusetts, have invented a certain new and useful Improvement in Pocketed Carriers and Methods of Producing the Same, of which the following is a specification, reference being had therein to the accompanying drawings.

The invention has relation in general to pocketed carriers on the order of those which are used for holding and carrying cartridges, packaged first-aid supplies, etc. Among the pocketed carriers to which the invention is applicable are comprised cartridge-carriers, hospital corps belts, medical officers' belts, and others having various special adaptations.

More particularly, the invention has relation to the pocketed cover-flaps of woven material with which carriers of the general class aforesaid are provided; especially to pocket cover-flaps which are woven integral with other parts of the carriers, although some of the features of invention are not necessarily confined to covers or cover-flaps which are thus woven.

The invention resides in pocketed carriers having pocket cover-flaps embodying various novel principles and features in their construction and in their combination with the other parts of the carriers, as well as in the method of producing a series of flaps upon a main web.

Pocket cover-flaps made in accordance with the invention are composed of two or more thicknesses of material and embody certain novel characteristics. The accompanying drawings illustrate different embodiments of the principles and features aforesaid, and also illustrate the method of production.

In the drawings,—

Figure 1 is an isometric view of a portion of a partly finished pocketed carrier illustrating the invention.

Fig. 2 is a view in vertical section in approximately the plane of dotted line 2—2 of Fig. 1.

Fig. 3 is a view in vertical section in approximately the plane of dotted line 3—3 of Fig. 1.

Fig. 4 is a sectional view corresponding with Fig. 3 but showing the cover-flap closed down and fastened.

Fig. 5 is a view of the left-hand pocket cover-flap of Fig. 1 in transverse cross-section, such cover-flap not having been introverted.

Fig. 6 is a view of the introverted cover-flap at the right of Fig. 1, in cross section on line 6—6.

Fig. 7 is a sectional view illustrating the addition of an inclosed lining to a tubular cover-flap.

Fig. 8, Sheet 2, is a view of a part of a cover-flap, illustrating the tucking of portions thereof to form a peak.

Fig. 9, Sheet 2, is a view similar to Fig. 1 of a partly finished pocketed carrier of a second form illustrating features of the invention.

Figs. 10, 11, and 12, respectively, are views in section along approximately the lines 10—10, 11—11, and 12—12, respectively, of Fig. 9, the cover-flap in Fig. 10 being turned down at the front of the pocket.

Figs. 13 and 14 illustrate methods, hereinafter mentioned, of finishing off the side margins of a cover-flap of seamless tubular weave.

Having reference to the drawings,—

Fig. 1 shows a carrier-web section comprising two pockets 1, 1, with their cover-flaps, and Fig. 9 shows one comprising three pockets and their cover-flaps. The invention may be utilized in the manufacture of carriers having in their finished state a series of pockets connected together as in the drawings, or in that of those having or consisting of individual pockets. The pockets are joined together in the carrier-web by the band-portions 2, 2, which are formed intermediate and at opposite sides of the respective pockets. Finished cover-flaps are shown at 3, 3, in different views, unfinished cover-flaps being represented at 3ª, 3ª. Interengaging fastener-members 31, 32, of the glove-fastener type are shown provided for use in securing the cover-flap in closed condition.

Pocket cover-flaps made in accordance with the present invention comprise a plurality of thicknesses of material. Most of the figures of the drawings show two thicknesses, namely 3ᵇ, 3ᶜ. Fig. 7 shows three, namely 3ᵇ, 3ᶜ, 3ᵈ. These thicknesses, at least the external ones, are united along the side-margins of a cover-flap, thereby giving the latter a tubular construction, as appears in Figs. 5 and 6. Preferably, though not necessarily in all instances, the uniting is effected by interweaving, as at 3ᵈ, 3ᵈ, in Figs. 5 and 6, thereby dispensing with stitches and other fastening means for this purpose, and with the operations by which the same are applied. Thereby, also, the cover-flap is produced of seamless tubular weave, which is a feature of the present invention. In the present instances, the thicknesses 3ᵇ, 3ᶜ, are joined together at the side margins of a cover-flap by being interwoven in flat marginal flanges at 3ᵈ, 3ᵈ.

The thicknesses composing the cover-flap are united across the outer or free end of the latter, as at 3ᵉ, so as to close the said end. Preferably, this is effected in the weaving, as will be apparent from the drawings, thereby dispensing with stitches and other fastening means for the purpose and with the operations by which the same are applied.

Another feature of invention consists in the cover-flaps formed as aforesaid being woven as a part of the carrier. The place of connection of the cover-flaps with the carrier may vary. Figs. 1, 2, 3, 4, and 7 show them woven upon and integral with the pocket-backs, which latter constitute in effect parts of the band-portion of the carrier. Figs. 9, 10, 11, and 12 show them woven upon and integral with the front-walls of the pockets. In the case of the first arrangement the cover-flap folds outward over the pocket and fastens to the front of the latter, in usual manner, the fastener-member 31 being combined with the pocket-front. In the case of the other arrangement, the cover-flap folds inward over the pocket and fastens at the back of the latter, the fastener-member 31 being applied to the reverse side of the carrier.

Cover-flaps embodying the features thus far described may be used without further finishing than the application of binding tapes 4, 4, as in Fig. 13, Sheet 2, to the projecting flanges 3ᵈ, 3ᵈ; or the hemming of the said flanges as at 3ᶠ, 3ᶠ, in Fig. 14, Sheet 1. As a further feature of invention, however, the cover-flaps are so formed that raw or cut edges at the margins thereof are inclosed between the thicknesses composing a cover-flap, and thereby are concealed and protected. Preferably this is effected by introverting each tubular cover-flap, so that the original exterior thereof and its marginal edges become disposed at the interior of the cover-flap, as in Fig. 6. The introverted cover-flap presents only smooth and firm margins, as will be apparent from Figs. 1, 6 and 9. The introversion is provided for by forming the cover-flaps with open mouths at their inner ends, the thicknesses being formed distinct from each other across the inner end of the cover-flap, producing a slit, 3ᵍ, Figs. 1, 2, 3, and 4, or 3ʰ, Figs. 9 and 10, which constitutes a mouth. After the introversion, the thicknesses are fastened together across the said end so as to close the slit, if desired, by means of a line 5 (Figs. 3, 4, 9, 11, and 12) of fastenings, usually stitches. Other lines, 6, 6, Figs. 1 and 9, may be applied along the side margins, and still other lines, 7, 7, may be applied intermediately if desired so as to produce a quilted effect.

The tubular character of the cover-flap facilitates the formation of the free end of the cover-flap into a peak as in Figs. 1 and 9, if desired, by tucking the corners of such end between the thicknesses, as indicated in Fig. 8, Sheet 2. Suitable lines 8, 8, of stitches secure the corners in tucked condition.

A characteristic feature which in Figs. 1 to 4 and 7 is shown embodied in the carrier is that of a cover-flap which is woven upon a pocket-wall or band-portion of the carrier below the top edge of said pocket-wall or band-portion. This provides for a continuous upstanding top-margin upon the band-portion of the carrier, giving a better appearance and finish. A related feature in the case of the cover-flap shown in such figures, consisting of double cloth, is that the top cloth thereof is a continuation of the portion 9 of said pocket-wall or band-portion which is located above the said junction, while the lower cloth thereof is a continuation of the portion of said pocket-wall or band-portion which is located below the said junction.

The intermediate thickness 3ᵈ of Fig. 7 may be of waterproof material, or may consist of a coating of waterproof nature applied to the inner surfaces of the cover-flap. Such thickness may consist of stiffening material, or may be of a resilient nature.

The form of carrier shown in Figs. 9 and 12 having the cover-flap attached to the pocket-front is claimed separately in my application filed Sept. 19, 1918, Serial No. 254,742. In closing the pocket, the free end of the said cover-flap is carried inward over the pocket and down at the back of the latter, and is fastened at the said back. After the said end has been unfastened, the cover-flap will fall or may be turned forward and outward away from over the top of the pocket, out of the way, and will not have to be held out of the way in order to render the contents of the pocket accessible.

The method of producing a series of flaps upon a main web, constituting a part of the invention, consists essentially in conducting the weaving so as to form the main web and also form a supplemental web composed of transversely tubular sections respectively woven to the said main web, and then severing the said supplemental web transversely between the tubular sections to separate the flaps from one another. This method may be carried into practical effect variously. When making the carrier of Figs. 1 to 7, the supplemental web may be produced in the relation to the main, or pocketed, web that is indicated in the case of the unfinished cover-flaps 3ª at the left-hand side in Fig. 1, and in Fig. 2. In weaving a tubular section constituting a cover-flap of the said carrier, the weft or filling will extend in one pick from the top edge of portion 9, through such portion, and also through the outer cloth 3ᵇ of the tubular section to the outer margin at 3ᵉ of the supplemental web; the next pick will extend from said margin through the inner cloth 3ᶜ to the tubular section as far as the slit 3ᵍ; the next pick will extend from slit 3ᵍ through the back wall of the pocket to the closed bottom of the latter; and another pick will extend through the front wall of the pocket from the bottom of the latter to the mouth of the pocket. The weft or filling will connect together the two cloths at the outer margin of the supplemental web, thereby forming the closed end 3ᵉ of the tubular section, as indicated in Fig. 2, so that at such end the tubular section will be woven closed. At slit 3ᵍ the two cloths remain separate and unconnected with each other, such slit forming the open mouth for the tubular section. In following the reverse course, the weft or filling will extend through the respective portions in an inverse order to the outer edge of portion 9, and so on. In case of a carrier-web which is not to be provided with the upstanding portion 9, the interweaving of the weft or filling with the warp-threads of the outer cloth 3ᵇ will begin and end at a point corresponding with the position of slit 3ᵍ. At the sides of a tubular section the warp-threads and weft or filling will be interwoven to join the two cloths together in the portions 3ᵈ, 3ᵈ, Fig. 5, thereby closing the tubular section at its sides. Between the places of union 3ᵈ, 3ᵈ, of successive tubular sections, at places corresponding substantially with the interval between one pocket and the next, the warp-threads of the supplemental web usually will be left unwoven, by floating the same, so as to save weft or filling and time in weaving. The weaving of the main web with its pockets concurrently with that of the supplemental web will proceed according to the preferred method. The severing of the supplemental web transversely to separate the flap-sections from one another is effected by cutting across the latter web at intermediate points, for example through the unwoven floated portions of the warp-threads thereof, as will appear from the short ends upon the section 3ª in Fig. 1. These ends are trimmed off subsequently. This places the flap-sections in condition to be introverted, which operation is then performed and followed by the other finishing operations.

In the production of the carrier-web of Figs. 9 to 12, in which the cover-flaps are woven upon the pocket-fronts, the supplemental web will be woven in the folded relation to the other parts of the carrier-web in which said supplemental web is represented in Fig. 10. The procedure in general is the same as already explained. The unfinished cover-flap 3ª at the right-hand side in Fig. 9 shows the same as it appears after the supplemental web has been severed transversely between one tubular section and the next but before the loose ends of warp-threads have been trimmed away. The other two cover-flaps of Fig. 9 are in their finished state.

What is claimed as the invention is,—

1. A pocketed carrier having a pocket cover-flap woven as an integral part thereof and comprising a plurality of thicknesses of cloth which are united marginally along both side edges of the cover-flap, with the raw marginal edges inclosed between such thicknesses by introversion of the cover-flap.

2. A pocketed carrier provided with an introverted tubular pocket cover-flap having its free end woven closed.

3. A pocketed carrier provided with an introverted pocket cover-flap of seamless tubular weave having its free end woven closed.

4. A pocketed carrier provided with an introverted pocket cover-flap woven as a part of the same and comprising a plurality of thicknesses of cloth which are woven together along the side-margins of the cover-flap and also across the free end thereof.

5. A pocketed carrier provided with an introverted pocket cover-flap of seamless tubular weave and having its free end woven closed, woven as a part of the carrier.

6. A carrier comprising a band-portion, a pocket woven therewith, and having a pocket cover-flap woven upon said band-portion of the carrier, below the top edge of said band-portion.

7. A carrier having a pocket cover-flap of double cloth, with the top cloth thereof a continuation of a portion of a carrier-wall located above the junction of the cover-flap with said wall, and the under cloth a continuation of the portion of said wall below said junction.

8. The method of producing a series of flaps upon a main web which consists in conducting the weaving so as to form the main web and also form a supplemental web composed of transversely-tubular sections respectively woven to said main web, and then severing said supplemental web transversely between the tubular sections to separate the flaps from one another.

9. The method of producing a series of flaps upon a main web which consists in conducting the weaving so as to form the main web and also form a supplemental web composed of transversely-tubular sections respectively having open mouths, then severing said supplemental web transversely between the tubular sections to separate the flaps from one another, and then introverting the flaps through said mouths.

10. The method of producing a series of flaps upon a main web which consists in conducting the weaving so as to form the main web and also form a supplemental web composed of transversely-tubular sections respectively woven to said main web, and in addition weave the cloths of said sections together along the outer margin of the supplemental web, and then severing said supplemental web transversely between the tubular sections to separate the flaps from one another.

11. The method of producing a series of flaps upon a main web which consists in conducting the weaving so as to form the main web and also form a supplemental web composed of transversely-tubular sections respectively having open mouths, and in addition weave the cloths of said sections together along the outer margin of the supplemental web, then severing said supplemental web transversely between the tubular sections to separate the flaps from one another, and then introverting the flaps through said mouths.

12. The method of producing a series of pocket-cover flaps upon a pocketed carrier-web which consists in conducting the weaving so as to form a main web with pockets and also form a supplemental web composed of transversely-tubular sections respectively woven to said carrier-web at the corresponding pockets, and then severing said supplemental web transversely between pockets to separate the flaps from one another.

13. The method of producing a series of pocket cover-flaps upon a pocketed carrier-web which consists in conducting the weaving so as to form a main web with pockets and also form a supplemental web composed of transversely-tubular sections at the corresponding pockets, respectively having open mouths, then severing said supplemental web transversely between pockets to separate the flaps from one another, and then introverting the flaps through said mouths.

14. The method of producing a pocketed carrier-web having a series of pocket cover-flaps integral therewith, and having an upstanding top-margin above the junction of a cover-flap with said web, which consists in conducting the weaving so as to form a main web with pockets and also form a supplemental web composed of transversely-tubular sections at the respective pockets, respectively, having open mouths, with one cloth of a tubular section a continuation of the portion of web which is located above the open mouth and the other cloth of such section a continuation of the web-portion which is located below such mouth, then severing the said supplemental web transversely between pockets to separate the flaps from one another, and then introverting the flaps through the said mouths.

In testimony whereof I affix my signature in presence of two witnesses.

GEORGE W. SPALDING.

Witnesses:
 FLORENCE RUSSELL,
 EMMA M. BAILEY.